United States Patent [19]

Marshall

[11] 4,405,956
[45] Sep. 20, 1983

[54] TRACKING APPARATUS FOR READ/WRITE HEAD

[75] Inventor: Sidney W. Marshall, Webster, N.Y.

[73] Assignee: Xerox Corporation, Stamford, Conn.

[21] Appl. No.: 256,334

[22] Filed: Apr. 22, 1981

[51] Int. Cl.³ .............................................. G11B 21/10
[52] U.S. Cl. ....................................... 360/78; 360/77
[58] Field of Search ....................... 360/78, 77, 72, 75, 360/135; 318/561, 638, 653

[56] References Cited

U.S. PATENT DOCUMENTS

| | | | |
|---|---|---|---|
| 4,087,843 | 5/1978 | Louis et al. | 360/78 |
| 4,115,823 | 9/1978 | Commander et al. | 360/78 X |
| 4,149,201 | 4/1979 | Card | 360/77 |
| 4,163,265 | 7/1979 | Herk et al. | 360/77 |
| 4,188,646 | 2/1980 | Sordello et al. | 360/48 X |
| 4,214,279 | 7/1980 | Oswald | 360/51 |
| 4,354,210 | 10/1982 | Droux | 360/77 |

OTHER PUBLICATIONS

IBM/TDB, vol. 21, No. 7, Dec. 1978, p. 3030-1, "FM Processing of Position Error Signals" by Fraser.
IBM/Journal of Research & Development, Oct. 1961, pp. 287-296, "A High Track-Density Servo-Access System . . . " by Hoagland.

*Primary Examiner*—John H. Wolff
*Attorney, Agent, or Firm*—Frederick E. McMullen

[57] ABSTRACT

A tracking apparatus for the read/write head of a recording disk. Positive and negative servo marks on the disk provide sine and cosine head position signals. A calculator generates sine and cosine signal approximations from the high frequency signal outputs of variable and fixed frequency oscillators. A comparator compares the sine and cosine head position signals with the sine and cosine signal approximations and generates a corrective signal where a difference exists. The corrective signal is used to set the frequency of the variable frequency oscillator until the corrective signal is brought to zero. The signal outputs of variable and fixed frequency oscillators are fed to the up and down inputs of a head actual position counter. A second comparator compares the count on the counter with the count on a head desired position register to provide a servo error signal for operating a servo motor which moves the head to the desired track. A feedback loop supplements the corrective signal with a signal derived from actuation of the servo motor to enhance response.

12 Claims, 10 Drawing Figures

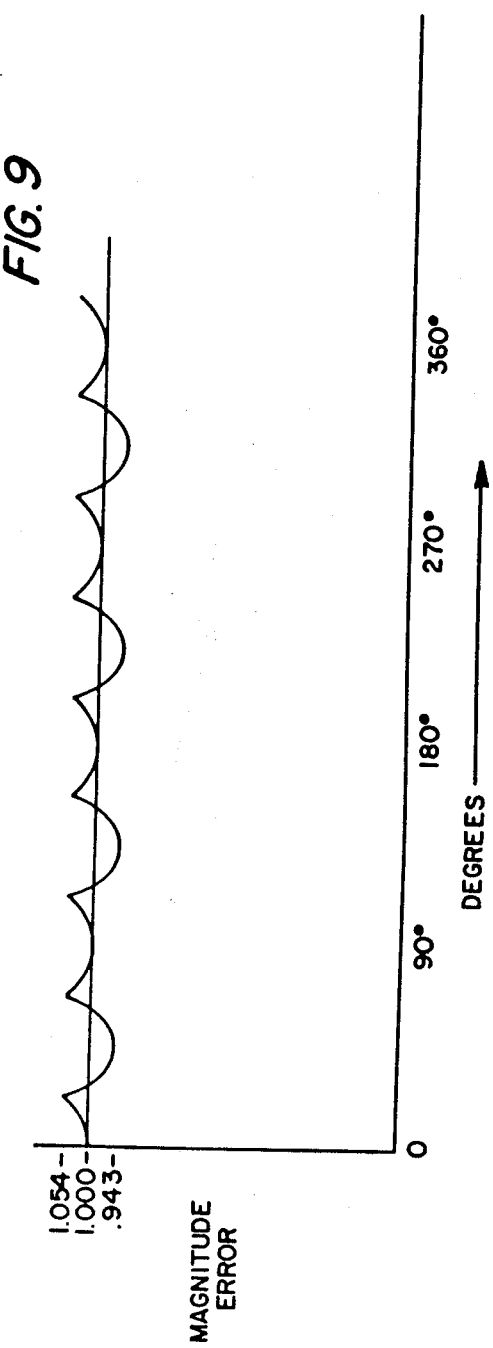
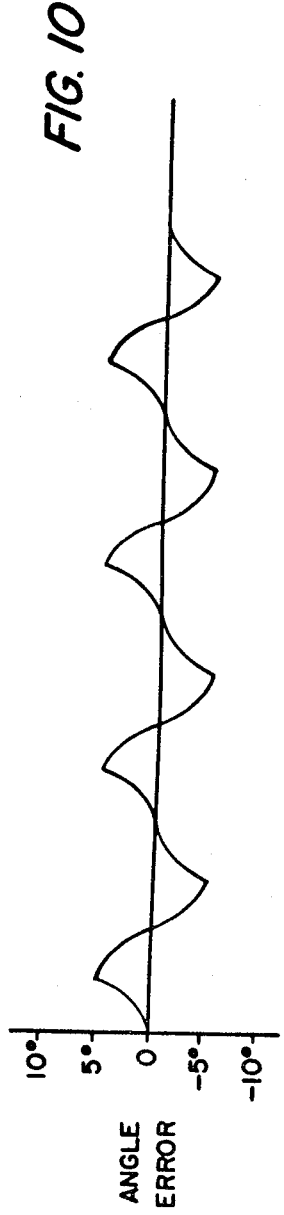

TRACKING APPARATUS FOR READ/WRITE HEAD

The invention relates to a tracking apparatus for locating the read/write head of a disk system, and more particularly to a tracking apparatus for read/write heads having enhanced operational flexibility.

Moving head disk systems are utilized for both information storage and retrieval. To accomplish these ends, the position of the system read/write head on the recording medium, normally a disk, must be continuously and accurately known so that information can be recorded in the location desired or so that information previously recorded and stored on the recording medium can be recovered.

To enable the head to be located, prior art systems divide the recording medium into sectors within which the information or data is stored, with a portion of the medium between sectors reserved for location indentifying marks. These marks are intended to permit the head monitoring and servo positioning system to find and position the head at the desired track location.

In use, the marks are read as the head moves relative to the recording medium. When the head is improperly located, an error signal is generated which is then employed to operate a servo motor and move the head. This continues until such time as the error signal returns to zero.

However, in the aforementioned prior art arrangement, a problem can arise during a seek operation when the head must cross a succession of tracks to reach the track desired. During this seek operation, the head may become lost due to an inability of the system, particularly where a high speed seek is performed, to indentify each track crossing. As a result, track count is lost or inaccurate leading to positioning of the head at the wrong track.

To obviate this problem, prior art systems arrange to move the head in steps, first to an approximate position where prewritten track identification information on the recording medium or on a separate servo disk surface is read. Then, with the location of the head determined, a second hopefully shorter move is then undertaken followed by a seek operation to locate the head track position desired. The position of the head is again determined, and if found to be incorrect, the operation is repeated again, and so forth and so on until the desired head location is obtained.

To remedy the foregoing prior art deficiencies, the invention provides a tracking apparatus for rapidly and accurately locating the read/write head on a data recording disk of the type having a plurality of data tracks separated into radially projecting data and servo sectors, comprising in combination: a first series of positive and negative servo marks in each of the servo sectors, the servo marks being arranged so that each positive and negative servo mark pair has a data track therebetween; a second series of positive and negative servo marks in each of the servo sectors, the second servo marks being offset from the first servo marks by one half a track, the first and second servo marks providing tracking signals that are 90° out of phase; means for reading the first and second servo marks as the head moves relative to the disk to provide tracking signals; and tracking means for locating the position of the head on the disk in response to the tracking signals.

In the drawings:

FIG. 9 is a plot of the potential error in magnitude of the sine and cosine signal approximations; and FIG. 10 is a plot of the potential error in angle of the sine and cosine signal approximations.

Figure 1:
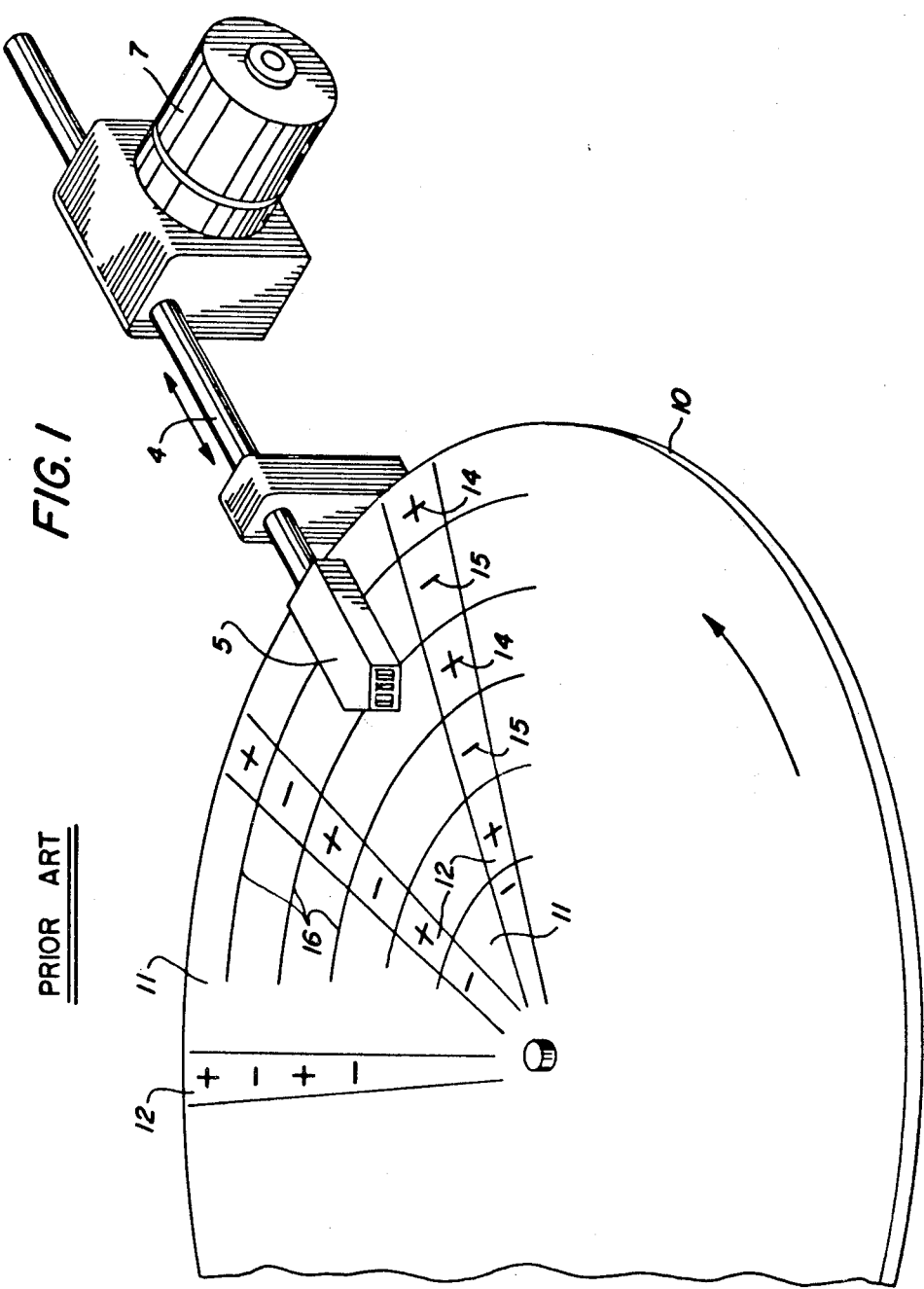
FIG. 1 is an isometric view illustrating a read/write head with a prior art type servo marking system.

Moving head disk units used for information storage and retrieval must be able to accurately position the read/write head on the recording medium so that information previously recorded can be recovered. Referring to FIG. 1, in one prior art arrangement, a sampled servo system is used to position a tone arm 4 carrying the read/write head 5. In the arrangement shown, tone arm 4 is drivingly connected to a servo drive motor 7. Selective actuation of servo motor 7 in either a forward or reverse direction extends or retracts arm 4 to move head 5 radially inwardly or outwardly over a recording disk 10 to the recording track 16 desired. Recording disk 10 is divided into data and servo sectors 11, 12, and space is reserved in each servo sector 12 for servo marks. In the FIG. 1 arrangement, alternate spaces between recording tracks 16 have servo marks 14, 15 of opposite polarity written on disk 10. Track location is defined as the location where the positive and negative servo marks are of equal signal amplitude and opposite in polarity.

During normal operation, the sampled servo system which includes a sensor 8 in head 5 (shown in FIG. 2) reads the servo information as the head 5 passes through servo sector 12 and generates an error signal proportional to the sum of the two adjacent servo marks 14, 15. The servo responds to cause read/write head 5 to follow a track 16 that is midway between servo marks 14, 15. In this prior art arrangement, the error signal, which is a function of read/write head position, is approximately a sine function. A track is defined at each zero crossing.

During a seek operation, the read/write head 5 moves across one track to another. If the velocity of the head is not too fast, it is possible to count track crossings by counting zero crossings of the servo error signal. However, if the velocity of the head is such that several tracks are crossed between sample times, then tracking crossings cannot be counted. One solution is to move the head approximately the right distance, acquire the nearest track, and then read prewritten track identification information to discover which track has been acquired. Following this, another much shorter seek is performed towards the desired track. The process of seeking and checking is continued until the desired track is reached.

However, there are some drawbacks to this approach in that the choice between concentric or spiral organization is frozen when the servo marks are written and are probably mutually exclusive, long seeks are not performed with minimum time, and track density equals servo mark density.

Figure 2:
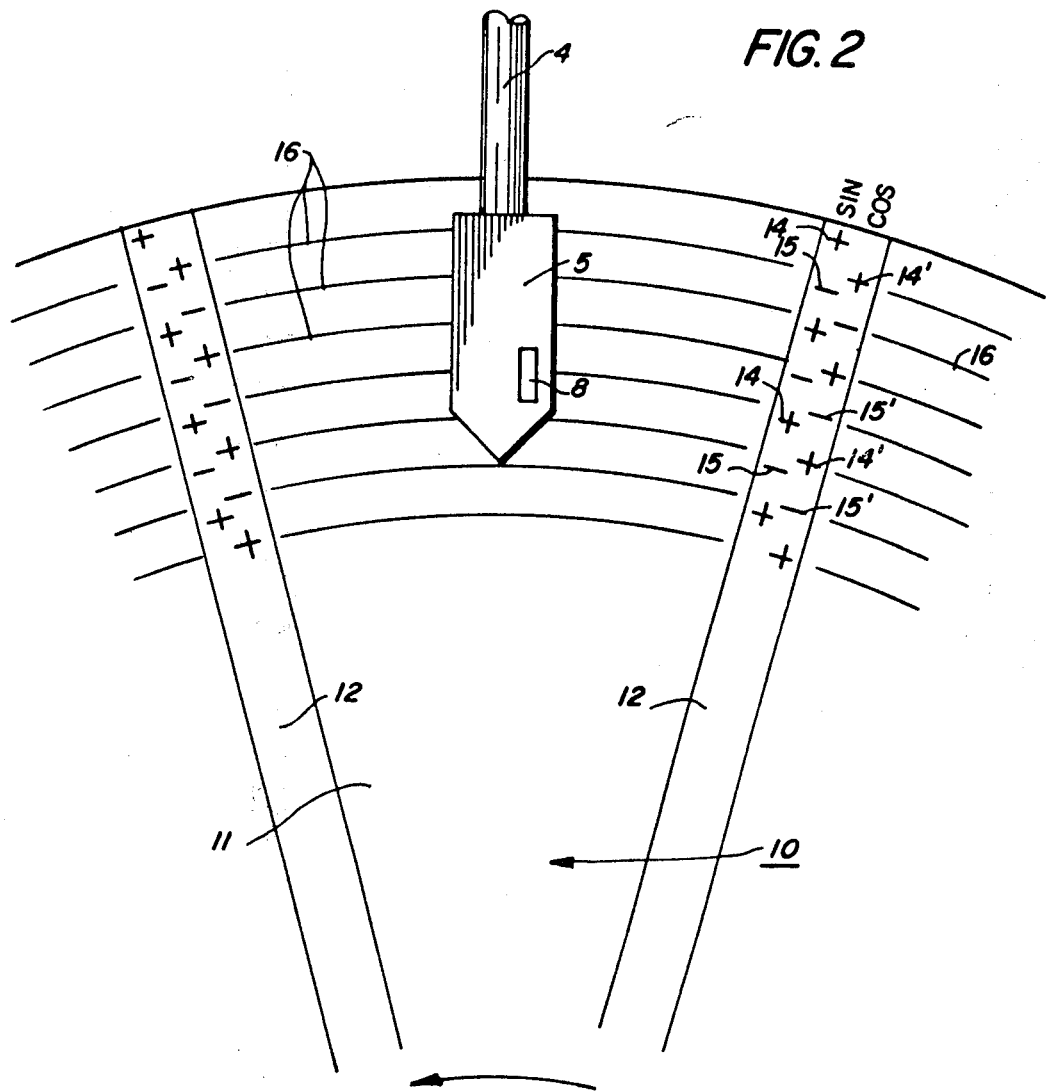
FIG. 2 is a top plane view of a disk incorporating the improved servo marking system of the present invention.

In the tracking apparatus of the present invention and referring to FIG. 2 where like numerals designate like parts, two sets of positive and negative servo marks 14, 15; 14′, 15′ are written on disk 10, one set 14, 15 being in the conventional position described above and the other set 14′, 15′ offset by one-half a track 16. As a result both a sine (SIN) error signal and a cosine (COS) error signal are available for use in positioning head 5.

As will be understood, if both the sine of an angle and the cosine of an angle are known, then the value of the angle is known up to a multiple of 360°. If an arbitrary angle A is chosen and the two error signals are SIN (E) and COS (E) and if the composite error signal SIN (E) COS (A)−COS (E) SIN (A)=SIN (E−A) is used by the disk servo system, then the servo system will position the read/write head 5 so that SIN (E−A) is zero. This is equivalent to offsetting the read/write head by a distance A from the nominal track position. It can be seen that there are no limits on the magnitude of angle A. For example, if A is made to increase continuously by generating the SIN (A) and COS (A) signals required in the generation of the composite error signal, then the servo will cause the head 5 to track a spiral. Conversely, if the two sets of servo marks are recorded in a spiral, continuously varying A at the spiral rate will cause the servo system to hold the tone arm 4 fixed. The combination of two sets of servo marks and servo system allows either concentric and/or spiral organization to be used on a disk whose servo marks are recorded concentrically or in a spiral but not both. It is also possible for the servo system to locate the tone arm 4 accurately even when it is "off track" because the cosine error signal is accurate when the sine error signal is near an extreme and vice versa.

The position of tone arm 4 can be measured in degrees where 360° is equal to two zero crossings of the error signal or two tracks. The velocity of the tone arm in degrees per sector or sample time is equal to the number of degrees the tone arm has moved between two consecutive sampling times. If the acceleration of the tone arm is bounded, then the difference between two successive tone arm velocities is also bounded. That is, if $x_1$, $x_2$, and $x_3$ are three successive positions of the tone arm at three successive sampling times, then $(x_2-x_1)-(x_3-x_2)=2x_2-x_1-x_3$ is bounded. In particular, if $x_1$ and $x_2$ are known, then $x_3$ is known to be close to $2x_2-x_1$, i.e. within the previously mentioned bound.

For example, if the disk 10 rotates at 3000 rpm and has 48 sectors or sampling times per revolution, there are therefore 417 microseconds between samples. If there are 1000 tracks in 2 inches of arm travel or 500 tracks/inch, and assuming there to be two tracks for each 360°, then there are 250×360 degrees/inch or 90,000 degrees/inch. The maximum acceleration of tone arm 4 may typically be considered as being 5 Gravities or 384 inch/second$^2$×5 or 1920 inch/second$^2$. The previously mentioned bound can be shown to equal $AT^2$ where A is the maximum acceleration and T is the sampling interval. Substituting, the bound is 333 microinches. Since there are 90,000 degrees/inch, the bound in degrees is 30°. Accordingly, if the arm 4 is accelerating at less than ±5 Gravities, the position of the arm at the next sampling time is known within ±30° by linear extrapolation from the two previous samples. Since this is much less than 180°, the absolute position of the tone arm can always be determined from the sine and cosine signals read from the disk 10 even though several tracks 16 may pass under the head 5 in a single sampling time. This abslute position information allows the servo system to locate the tone arm without uncertainty and for both concentric or spiral disk organizations.

By estimating acceleration of the head 5, as for example, by monitoring the current through the servo motor, accurate tracking of a sampled servo system with accelerations that would otherwise exceed the above acceleration bounds may be accomplished.

Figure 3:
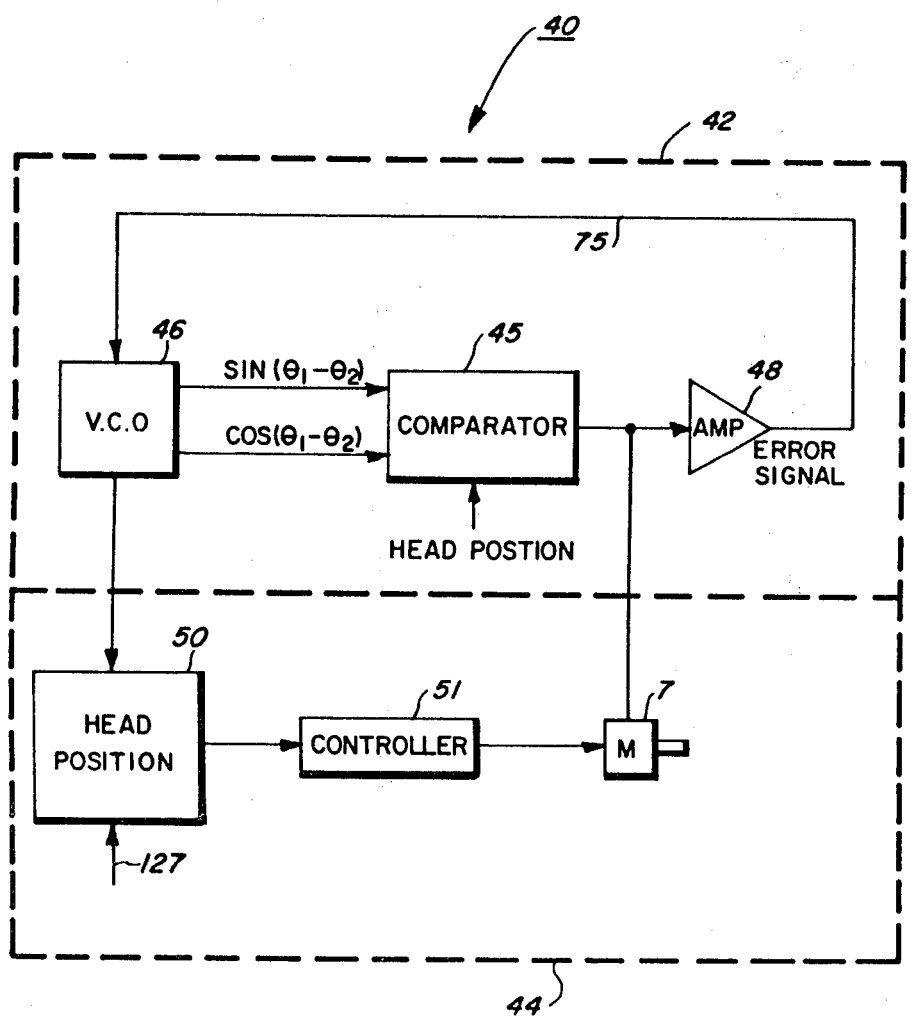
FIG. 3 is a block diagram of the tracking apparatus of the present invention adapted for use with the servo marking system of FIG. 2.
Figure 4:
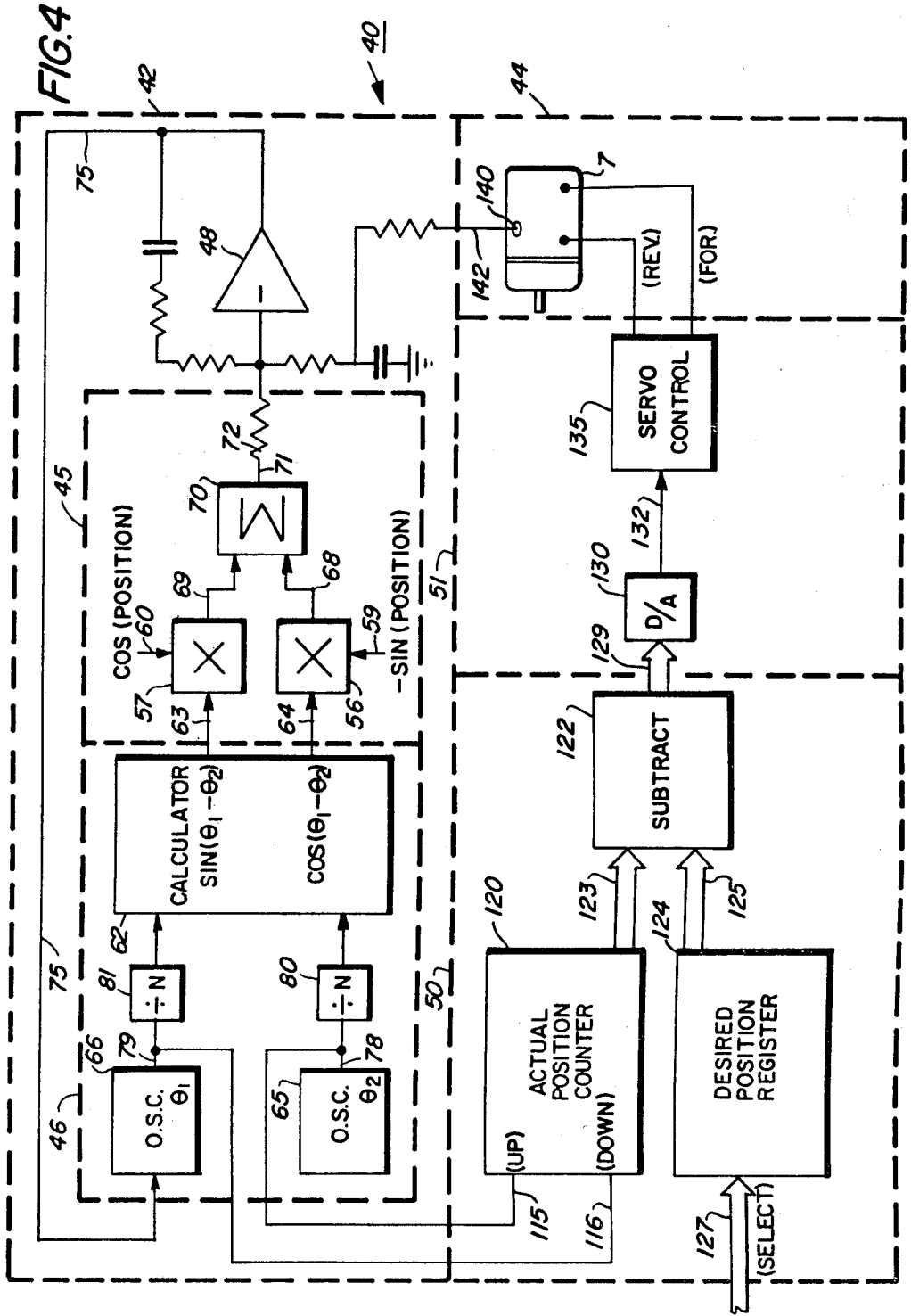
FIG. 4 is a block diagram showing details of the tracking apparatus seek circuit.

Referring to FIGS. 3 and 4, a seek circuit 40 which will work with disks having either spiral or concentric track configurations is provided. Seek circuit 40 includes a tracking portion 42 for continously tracking the position of arm 4 and a control portion 44 for operating servo motor 7 to move arm 4.

Tracking portion 42 of control circuit 40 has a comparator section 45 for comparing the phase difference between the sine and cosine position signals generated by servo sensor 8 as head 5 moves across servo marks 14, 15; 14′, 15′ with the sine and cosine signal approximations [SIN $(\theta_1-\theta_2)$, COS $(\theta_1-\theta_2)$] produced by Voltage Controlled Oscillator (VCO) section 46. Where a difference in signal phase is detected, a corrective signal is output by comparator section 45 to an inverting operational amplifier 48. The resulting error signal output by amplifier 48 is fed through return loop 75 to the control terminal of VCO section 46 to adjust the frequency of the sine [SIN $(\theta_1-\theta_2)$] and cosine [COS $(\theta_1-\theta_2)$] signal approximations output by VCO section 46.

Referring particularly to FIG. 4, VCO section 46 includes a pair of square wave oscillators 65, 66, oscillator 65 comprising a fixed frequency oscillator such as a crystal oscillator while oscillator 66 comprises a variable frequency oscillator such as a voltage controlled oscillator. The signal outputs of oscillators 65, 66 ($\theta_1$, $\theta_2$) are fed through lines 78, 79 to a calculator 62. As will appear, calculator 62 serves to generate the sine and cosine signal approximations SIN $(\theta_1-\theta_2)$, COS $(\theta_1-\theta_2)$ referred to above from the square wave signal inputs ($\theta_1$, $\theta_2$) of oscillators 65, 66. Divide by N counters 80, 81 are provided in lines 78, 79 to enhance signal resolution.

Comparator section 45 includes a pair of multiplier circuits 56, 57 to which the sine and cosine position signals output by servo sensor 8 of head 5 are input through lines 59, 60, and an adder circuit 70. The sine and cosine signal approximations output by calculator 62 of VCO section 46 are input to the second gate of multipliers 57, 56 through lines 63, 64 respectively. The output of multipliers 56, 57 is fed through lines 68, 69 to adder 70. Adder 70 adds the sine and cosine reference signals input thereto to generate a signal proportional to the difference between the head position angle, as represented by the sine and cosine position signals output by servo sensor 8, and the calculated position angle as represented by the sine and cosine approximations output by calculator 62, to provide a correction signal. The corrective signal output of adder 70 is fed through line 71 and resistor 72 to amplifier 48. Circuit network 49 serves to stabilize return loop 75.

Figure 5:
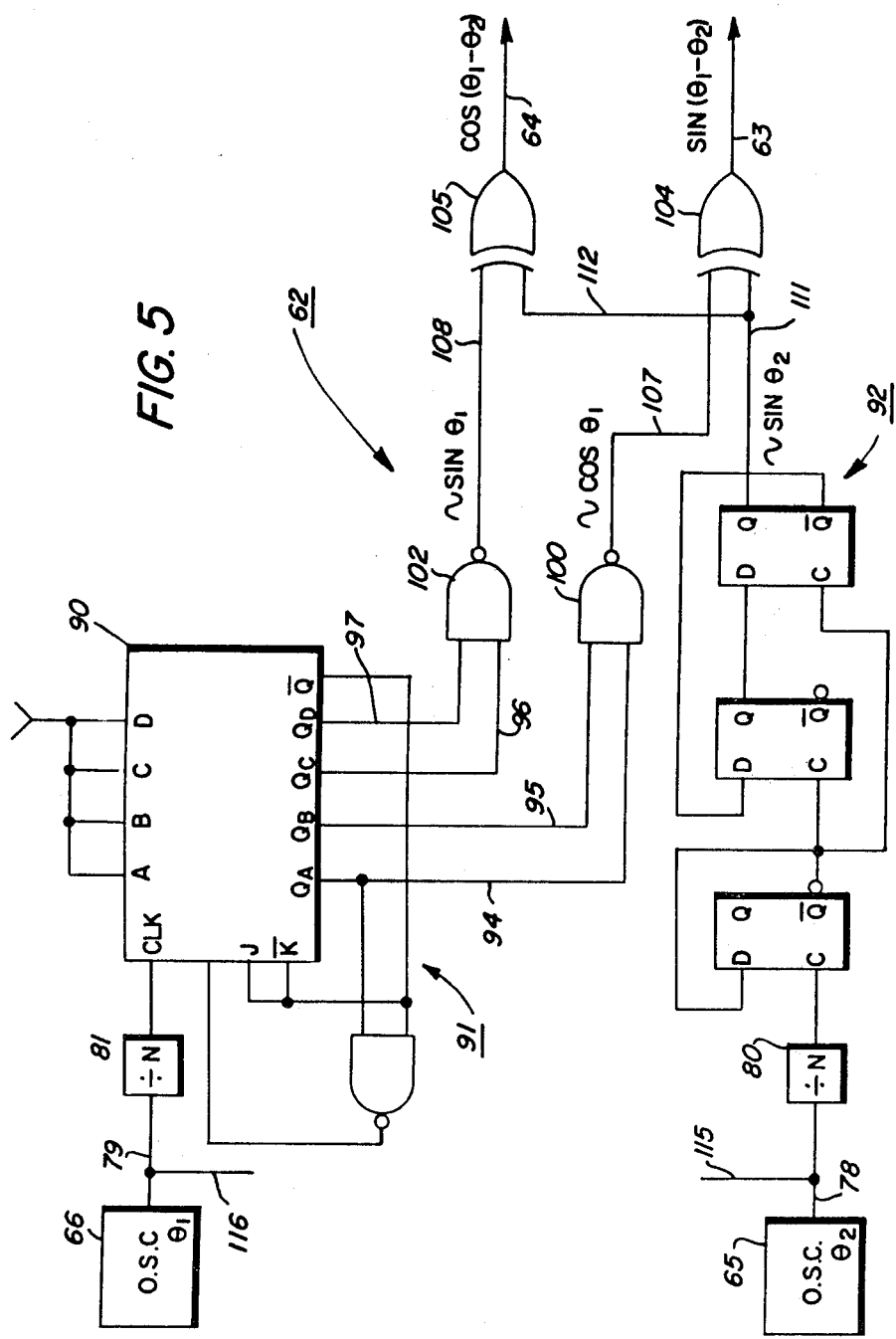
FIG. 5 is a circuit diagram showing details of the sine and cosine signal approximation calculator of the tracking apparatus seek circuit.

Referring particularly to FIG. 5 of the drawings, calculator 62 includes a pair of shift registers 90, 92. Output stages QA, QB, QC, QD of shift register 90 are coupled by lines 94, 95 and 96, 97 to inverter gates 100, 102 respectively. A feedback loop 91 assures a four phase signal output by register 90 to gates 100, 102.

The outputs of gates 100, 102, which approximate sine and cosine waveforms, are coupled to the input terminals of exclusive OR gates 104, 105 through lines 107, 108 respectively. The output of shift register 92 (SIN $\theta_2$) is coupled to a second input of exclusive OR gates 104, 105 through lines 111, 112. The outputs of gates 104, 105, which comprises the SIN $(\theta_1-\theta_2)$ and COS $(\theta_1-\theta_2)$ signal approximations referred to above, are fed to multipliers 57, 56 through lines 63, 64 respectively.

Figure 6:
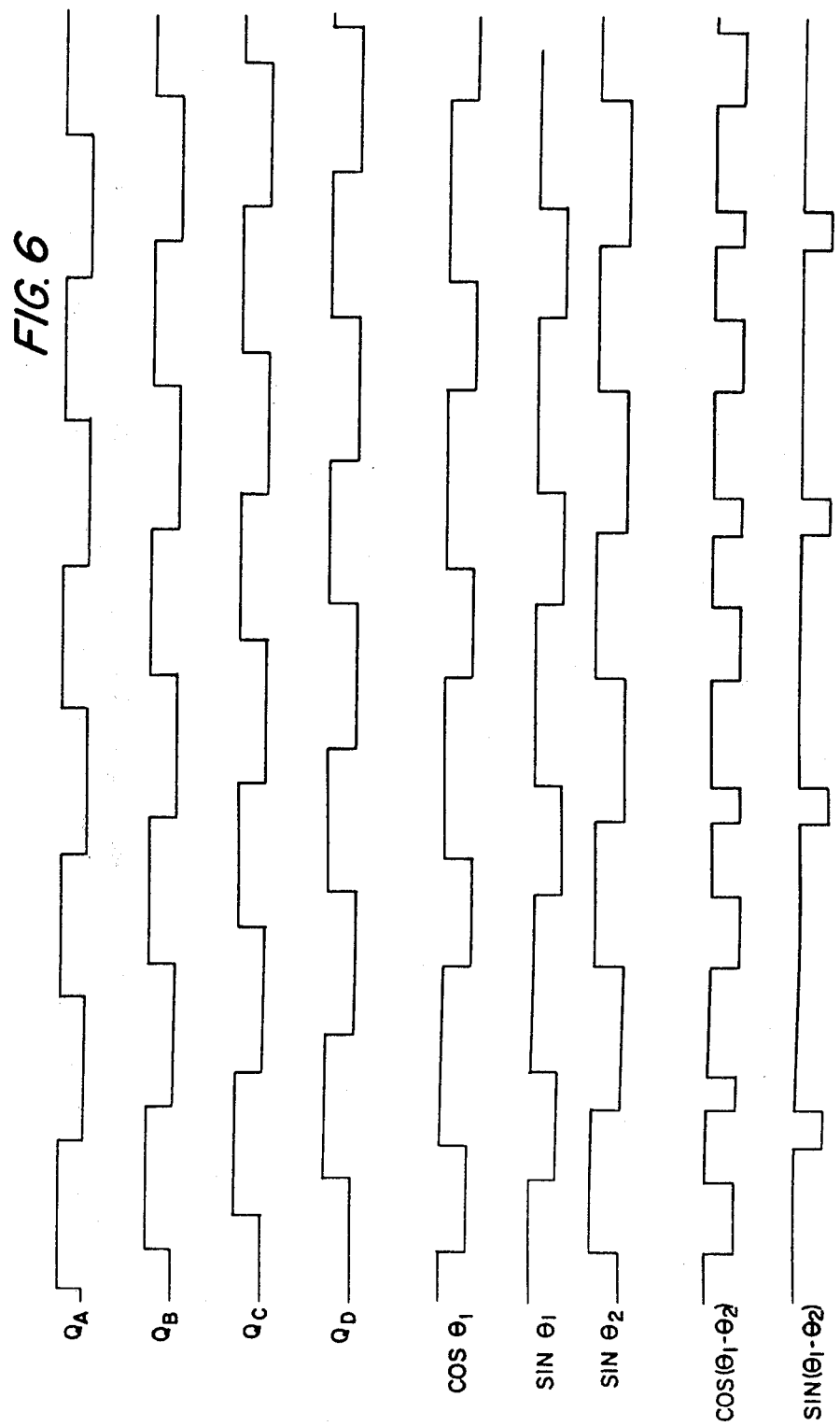
FIG. 6 is a graph showing signal waveforms at selected points in the circuit shown in FIG. 5.

In the timing chart of FIG. 6, examples of various wave forms produced are shown. Referring thereto, shift register 90 generates square wave output pulses QA, QB, QC, QD in lines 94, 95, 96, 97. Gates 100, 102 change the duty cycle of the pulses QC, QD and QA, QB respectively to provide SIN $\theta_1$ and COS $\theta_1$ waves. Concurrently, the square wave pulses output by oscillator 65 to shift register 92 which comprises a succession of divide by 2 shifters provides square wave output pulses SIN $\theta_2$ in lines 111, 112 to exclusive OR gates 104, 105. Exclusive OR gates 104, 105 respond to the signal inputs thereto to produce the wave forms SIN $(\theta_1-\theta_2)$, COS $(\theta_1-\theta_2)$.

It will be understood that oscillators 65, 66 are not necessarily in phase or if in phase, may not remain in phase. Accordingly, the phase relationship of the output wave forms shown in FIG. 5 is exemplary only and subject to change with changes in phase.

Referring again to FIGS. 3 and 4 tracking portion 44 of seek circuit 40 includes a head position section 50 which compares the actual position of read/write head 5 to desired head position and a controller section 51 for controlling operation of servo motor 7 in response to signals from head position section 50 to move head 5 to the selected track position.

Head position section 50 includes actual position counter 120 and desired position register 124. Output lines 78, 79 of oscillators 65, 66 are tapped by lines 115, 116 coupled to the countup (U) and countdown (D) inputs of actual position register 120. The output of counter 120 is coupled to one input of digital subtractor 122 through bus 123 while the output of register 124 is coupled to a second input of subtractor 122 through bus 125. A select data signal (SELECT) representing the selected track position is input to desired position register 124 through bus 127. The SELECT signal may originate from any suitable source such as a computer, operator control console, etc.

The output of subtractor 122 is coupled through bus 129 to a digital to analog converter 130 of controller section 51. Converter 130 serves to convert the signal output of subtractor 122 to an analog signal as will be understood by those skilled in the art. A suitable servo motor control 135 for operating servo motor 7 in either a forward or reverse direction in response to the signal output of converter 130 is provided. Line 132 couples the output of converter 130 to the input terminal of servo motor control 135.

A suitable sensor such as a current transducer 140 is provided for sensing acceleration of servo motor 7. The output of transducer 140 is input to tracking portion 42 through line 142, line 142 being coupled to the input of amplifier 48.

OPERATION

Referring particularly to FIGS. 2-5 and assuming read/write head to be in desired position and centered over a selected track 16 on the rotating disk 10, the sine and cosine position signals output by servo sensor 8 in head 5 as head 5 passes across sector gaps 12 separating data sectors 11 comprises a "0" and a "1" respectively. With the system in a steady state, the frequency of oscillators 65, 66 ($\theta_1$, $\theta_2$) is equal and the phase difference is N times the position angle. As a result, no corrective signal appears at the output of adder 70. And inasmuch as read/write head 5 is presumed to be in the desired position, actual position counter 120 is counted up as rapidly as counter 120 is counted down. As a result, actual position counter 120 and desired position register 124 agree. Servo motor 7 is de-energized and no servo acceleration signal is output by transducer 140.

Should head 5 stray from the track, either due to error or operation of servo motor 7, both the sine and cosine position signals generated in lines 59, 60 change. Calculator 62 continuously calculates head position and with a change in head position, the corrective signal output by adder 70 to amplifier 48 is no longer zero. As a result, a proportional error signal is output by amplifier 74 to return loop 75 changing the frequency control setting of variable oscillator 66. Calculator 62 responds to the resulting change in the frequency relationship between oscillators 65, 66 to output new SIN $(\theta_1-\theta_2)$ and COS $(\theta_1, \theta_2)$ signals to comparator section 45. There the sine and cosine position signals output by servo sensor 8 of head 5 and the sine and cosine approximations of calculator 62 are effectively differenced to provide a new correction signal updating the setting of variable oscillator 66 tending to drive the correction signal output of adder 70 to zero.

At the same time, the change in output frequency of oscillator 66 changes the relative count between actual position counter 120 and desired position register 124 which in turn can be used to move read/write head 5 to the proper position. In the arrangement shown, servo motor control 135 of controller section 51 operates servo motor 7 to adjust the position of head 5 in response to the difference signal produced. With operation of servo motor 7, transducer 140 generates a signal which is combined with the corrective signal generated by comparator section 45 at the input to amplifier 74 to control the output frequency of variable oscillator 66. The foregoing continues until such time as head 5 is again centered over the selected track at which point the system is in balance.

In the event it is desired to move head 5 to another track or disk 10, a data signal (SELECT) identifying the new track is input to bus 127 to set desired position register 124 to the desired track position. The change in the setting of register 124 upsets the balance between register 124 and actual position counter 120, the difference being represented in the form of a servo error signal output by subtractor 122 to servo motor control 135 of controller section 51. Control 135 responds to the servo error signal to actuate servo motor 7 to move head 5 in the appropriate direction as determined by the sign of the servo error signal input. Transducer 140 detects servo motor acceleration and outputs a signal in line 142 to amplifier 48 of tracking portion 42 to aid in the tracking of head 5, it being understood that tracking portion 42 continually tracks head 5 through the sine and cosine position signals output by servo sensor 8. Effectively therefore, the signal output of control portion 44 to tracking portion 42 of seek circuit 40 represents a feed forward control which enhances the ability of variable oscillator 66 to track current head position.

It will be understood that line 142 may be dispensed with and in that circumstance tracking portion 42 of seek circuit 4 will continue to track the position of head 5 in the manner described but not as rapidly.

As described, movement of arm 4 by servo motor 7 generates changing sine and cosine position signals as head 5 passes across sector gaps 12 toward the desired destination. The sine and cosine position signals produced are output to multipliers 56, 57 of comparator section 45. The resulting change in the output phase of oscillator 66 of VCO section 46, which tracks the position of arm 44, results in a change in the sine or cosine signal approximations output by calculator 62. As described, comparator section 45 continually compares the sine and cosine position signals with the sine and cosine signal approximations to provide a corrective signal to amplifier 48 in response to any phase difference therebetween.

The foregoing proceeds until the count on actual position register 120 of head position section 50 equals or balances the new count on desired position register 124, it being understood that the respective counts on registers 120, 124 are in effect monitored by subtractor 122. As the count on actual position register 120 approaches the selected count on register 124, the error signal output of subtractor 122 becomes less and less until the error signal finally drops to 0. At that point servo motor control 135 terminates operation of servo motor 7.

Figure 7:
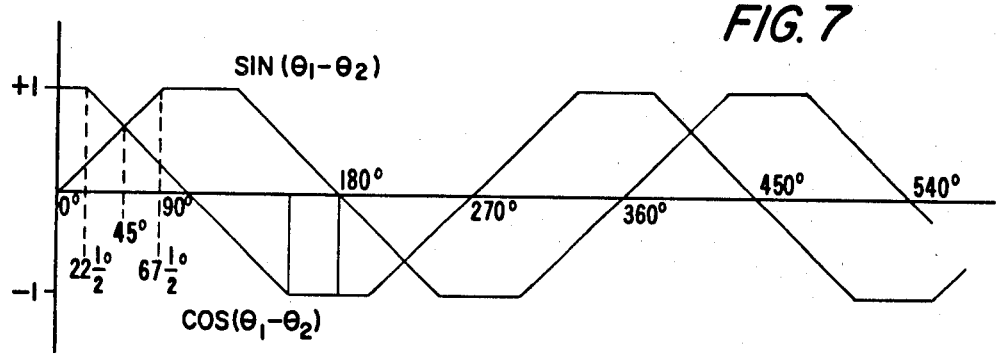
FIG. 7 is a graphical representation of the sine and cosine signal approximations produced by the calculator circuit.

As described, the circuit shown in FIG. 5 serves to generate approximations to the sine and cosine of the phase difference between the outputs of two square wave oscillators 65, 66 as shown in FIG. 7. Since the frequency of oscillator 65 is fixed while the frequency of oscillator 66 is variable, the circuit of FIG. 5 generates the sine and cosine of an angle whose rate of change is proportional to the voltage applied to oscillator 66. This rate of change, which can be either positive or negative, represents the frequency difference between oscillators 65, 66.

Figure 8:
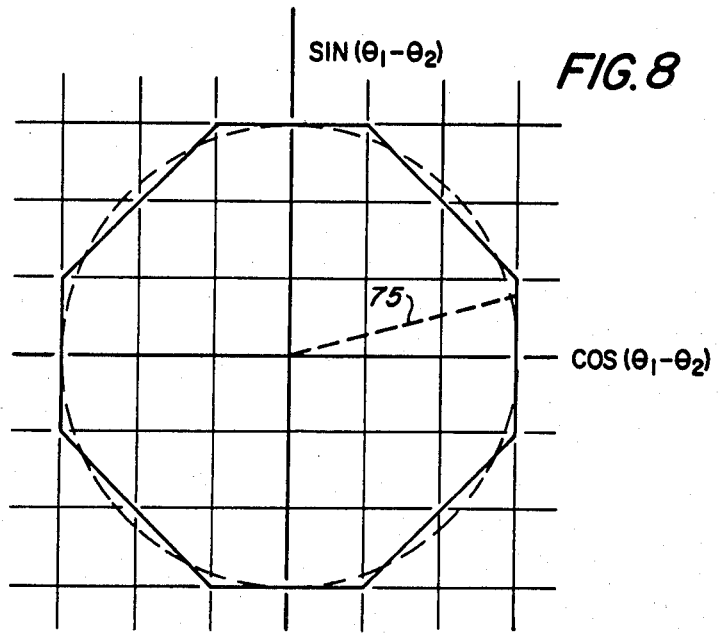
FIG. 8 is a vector graph of the sine and cosine signal approximations plotted against one another.

In FIG. 8, the averaged sine signal output by calculator 62 is plotted against the averaged cosine signal output by calculator 62. As can be seen, the result is a vector 75 whose components are the approximate sine and cosine. Vector 75 is subject to two types of error: a magnitude error and an angle error. It has been found that the magnitude error in the sine and cosine approximations generated by the circuit shown in FIG. 5 is in the range of 0.943 to 1.054 (FIG. 9) while the angle error is never more than 5° (FIG. 10). Thus, when applied to a servo system for positioning a read/write head, the gain fluctuates by a factor of 0.943 to 1.054 while the angle error is always less than 5°.

There is therefore provided a seek controller for positioning the read/write head of a recording disk applicable to either spiral or concentric track organization. The controller consists of a first part which continuously tracks the position of the head and a second part controlling operation of the servo motor which moves the head. The second part recognizes any difference between the actual position of the head and the desired position of the head and generates an error signal representative thereof commanding operation of the servo motor. The seek controller can be a "bang bang" type control to minimize response time and optimize seek times.

While the invention has been described with reference to the structure disclosed, it is not confined to the details set forth, but is intended to cover such modifications or changes as may come within the scope of the following claims.

I claim:

1. In a tracking apparatus for locating the read/write head on a data recording disk, the disk having a plurality of data tracks separated into radially projecting data and servo sectors, the improvement comprising:
   (a) a first series of positive and negative servo marks in each of said servo sectors, said servo marks being disposed so that each plus and minus servo mark pair has a data track therebetween;
   (b) a second series of positive and negative servo marks in each of said sectors, said second servo marks being offset from said first servo marks by one half a track, said first and second servo marks providing tracking signals that are 90° out of phase;
   (c) means for reading said first and second servo marks, as said head moves relative to said disk to provide said tracking signals; and
   (d) tracking means for locating the position of said head on said disk in response to said tracking signals.

2. The tracking apparatus according to claim 1 in which said first pairs of positive and negative servo marks straddle said data tracks.

3. The tracking apparatus according to claims 1 or 2 in which said first and second series of servo marks are arranged in a spiral on said disk.

4. The tracking apparatus according to claim 1 including:
   (a) servo means for moving said head from one track to another;
   (b) first means for producing a signal representing the current location of said head in response to said tracking signals;
   (c) second means for producing a signal representing a new head location;
   (d) comparator means for comparing the signal outputs of said first and second means to provide a servo control signal representative of the difference between the signal outputs of said first and second means; and
   (e) means for actuating said servo means in response to said servo control signal whereby to move said head from said current location to said new location.

5. The tracking apparatus according to claim 4 in which said first means comprises a counter means having incrementing and decrementing terminals and producing a signal proportional to the count differential thereon;
   (a) a variable frequency source, the output of said variable frequency source being coupled to one of said counter means terminals;
   (b) a fixed frequency source, the output of said fixed frequency source being coupled to a second of said counter means terminals; and
   (c) control means for adjusting the frequency of said variable frequency source output in response to said tracking signals whereby to change the signal output of said counter means in response to movement of said head relative to said disk.

6. The tracking apparatus according to claim 5 including means for generating a signal in response to actuation of said servo means, and
means for combining said signal with said tracking signals whereby said control means adjusts the frequency of said variable frequency source in response to both operation of said servo means and movement of said head.

7. The tracking apparatus according to claim 5 including:
   (a) means for generating sine and cosine signal approximations from the outputs of said variable and fixed frequency sources;
   (b) means for comparing said sine and cosine signal approximations with said tracking signals to provide a corrective signal; and
   (c) said control means adjusting said variable frequency source output in response to said corrective signal.

8. In a tracking apparatus for locating the read/write head on a data recording disk, the disk having a plurality of data tracks segregated by radially projecting servo locating sectors, the improvement comprising:
   (a) a first series of positive and negative servo marks in each of said sectors, said servo marks being disposed so that each plus and minus servo mark pair has a data track therebetween;
   (b) a second series of positive and negative servo marks in each of said sectors, said second servo marks being offset from said first servo marks by one half a track;
   (c) means for reading said first and second servo marks as said head moves relative to said disk to provide sine and cosine position signals representing current head position;
   (d) means for generating sine and cosine reference signals; and
   (e) comparator means for comparing said sine and cosine position signals with said sine and cosine reference signals to provide a corrective signal for correcting said sine and cosine reference signals when said sine and cosine position signals and said sine and cosine reference signals are different.

9. The tracking apparatus according to claim 8 including:
   (a) servo means for moving said head from one track to another;
   (b) means for generating a signal representing desired head location;
   (c) second comparator means for comparing said sine and cosine position signals with said desired head location signal to provide a servo control signal; and
   (d) means for actuating said servo means in response to said servo control signal to move said head to said desired head location.

10. A seek control for a read/write head disposed in operative relationship with a disk having multiple recording tracks thereon, said disk being segregated into radial segments comprised of data and servo mark sectors, comprising in combination:
   (a) a first series of positive and negative servo mark pairs on said disk in each of said servo mark sectors, said servo marks being disposed so that each plus and minus servo mark pair has a data track therebetween, and a second series of positive and negative servo marks in each of said sectors, said second servo marks being offset from said first servo marks by one half a track, said first and second servo marks providing sine and cosine position signals on relative movement between said head and said disk;
   (b) a pair of high frequency signal sources;
   (c) means for generating sine and cosine reference signals from the signal outputs of said signal source pair; and
   (d) means for identifying the current position of said head from said sine and cosine position signals and said sine and cosine reference signals.

11. The seek control according to claim 10 including:
   (a) means for identifying desired head position;
   (b) comparator means for comparing the current position of said head with the desired position of said head, said comparator means generating a control signal in response to a difference between head current position and head desired position;
   (c) head drive means for changing the position of said head in response to said control signal; and
   (d) means for adjusting the frequency relationship between said signal source pair in response to changes in the position of said head on said disk.

12. The seek control according to claim 11 including means for adjusting the frequency relationship between said signal source pair in response to actuation of said head drive means.

* * * * *